US012431143B1

(12) United States Patent
Valin et al.

(10) Patent No.: US 12,431,143 B1
(45) Date of Patent: Sep. 30, 2025

(54) NEURAL CODING FOR REDUNDANT AUDIO INFORMATION TRANSMISSION

(71) Applicant: Amazon Technologies, Inc., Seattle, WA (US)

(72) Inventors: Jean-Marc Valin, Montreal (CA); Jan Buethe, Munich (DE); Ahmed Mustafa, Aachen (DE)

(73) Assignee: Amazon Technologies, Inc., Seattle, WA (US)

( * ) Notice: Subject to any disclaimer, the term of this patent is extended or adjusted under 35 U.S.C. 154(b) by 284 days.

(21) Appl. No.: 18/345,838

(22) Filed: Jun. 30, 2023

(51) Int. Cl.
*G10L 19/00* (2013.01)
*G10L 19/04* (2013.01)

(52) U.S. Cl.
CPC .......... *G10L 19/0017* (2013.01); *G10L 19/04* (2013.01)

(58) Field of Classification Search
CPC ... G10L 19/0017; G10L 19/04; G10L 19/005; G10L 19/002; G10L 19/24; G10L 19/06; G10L 19/009; G10L 19/18; G10L 2019/0016
See application file for complete search history.

(56) References Cited

U.S. PATENT DOCUMENTS 9,026,434 B2 5/2015 Greer et al.
2009/0248404 A1* 10/2009 Ehara .................... G10L 19/005 704/219
2012/0265523 A1* 10/2012 Greer .................... G10L 19/005 704/E21.001
2015/0039323 A1* 2/2015 Ishikawa ............. G10L 19/0017 704/500
2019/0074018 A1* 3/2019 Schnabel ................ G10L 19/09

OTHER PUBLICATIONS

Imvalin, "xiph / LPCNet", URL https://github.com/xiph/LPCNet/commits/exp_rdovae4, Sep. 7, 2022, pp. 1-3.

W. B. Kleijn, F. SC Lim, A. Luebs, J. Skoglund, F. Stimberg,Q. Wang, and T. C. Walters, "WaveNet based low ratespeech coding," in Proc. International Conference on Acoustics, Speech and Signal Processing (ICASSP), 2018, pp. 676-680 (retrieved from arXiv:1712.01120v1, 2017, pp. 1-5).

J. Klejsa, P. Hedelin, C. Zhou, R. Fejgin, and L. Villemoes, "High-quality speech coding with sample mn," in Proc. International Conference on Acoustics, Speech and Signal Processing (ICASSP), 2019 (retrieved from arXiv:1811.03021v1 2018, pp. 1-5).

(Continued)

*Primary Examiner* — Yogeshkumar Patel
(74) *Attorney, Agent, or Firm* — S. Scott Foster; Kowert, Hood, Munyon, Rankin & Goetzel, P.C.

(57) ABSTRACT

Neural coding techniques may be implemented for transmission of redundant audio data. An encoding technique is implemented that uses forward encoding along with an initial state to include multiple audio frames from audio data represented as latent vectors in a network packet transmitted to a recipient. The recipient can then use backward decoding and the initial state to obtain the multiple audio frames from the latent vectors. The multiple audio frames provided in the network packet are redundant audio data that can be used to generate missing audio data.

20 Claims, 7 Drawing Sheets

(56) References Cited

OTHER PUBLICATIONS

J.-M. Valin and J. Skoglund, "A real-time wideband neuralvocoder at 1.6 kb/s using LPCNet," in Proc. Interspeech, 2019 (retrieved from arXiv:1903.12087v2, pp. 1-5).
L. Diener, S. Sootla, S. Branets, A. Saabas, R. Aichner, andR. Cutler, "Interspeech 2022 audio deep packet loss concealment challenge," in Proc. Interspeech, 2022 (retrieved from arXiv:2204. 05222v1, pp. 1-5).
I. Kouvelas, O. Hodson, V. Hardman, M. Handley, J.C. Bolot,A. Vega-Garcia, and S. Fosse-Parisis, "Rtp payload for redundantaudio data," RFC 2198, Sep. 1997, https://tools. ietf.org/html/rfc2198, pp. 1-11.
J.-M. Valin, K. Vos, and T. B. Terriberry, "Definition of theOpus Audio Codec," RFC 6716, Sep. 2012, https://tools.ietf.org/html/ rfc6716.
J.-M. Valin, A. Mustafa, C. Montgomery, T.B. Terriberry,M. Klingbeil, P. Smaragdis, and A. Krishnaswamy, "Real-timepacket loss concealment with mixed generative and predictivemodel," in Proc. Interspeech, 2022 (retrieved from arXiv:2205.05785v1 , pp. 1-5).
J.-M. Valin and J. Skoglund, "LPCNet: Improving neuralspeech synthesis through linear prediction," in Proc. International Conference on Acoustics, Speech and Signal Processing (ICASSP), 2019, pp. 5891-5895 (retrieved from arXiv:1810.11846v2 pp. 1-5).
Aaron van den Oord, Oriol Vinyals, and Koray Kavukcuoglu,"Neural discrete representation learning," Advances in neuralinformation processing systems, vol. 30, 2017, pp. 1-10.
N. Zeghidour, A. Luebs, A. Omran, J. Skoglund, andM. Tagliasacchi, "SoundStream: An end-to-end neural audiocodec," Trans. on Acoustics, Speech, and Signal Processing,vol. 30, 2021 (retrieved from arXiv:2107.03312v1, pp. 1-12).
J. Casebeer, V. Vale, U. Isik, J.-M. Valin, R. Giri, and A. Krishnaswamy, "Enhancing into the codec: Noise robust speechcoding with vector-quantized autoencoders," in Proc. International Conference on Acoustics, Speech and Signal Processing (ICASSP), 2021 (retrieved from arXiv:2102.06610v1, pp. 1-5).
D.P. Kingma and M. Welling, "Auto-encoding variationalBayes," arxiv:1312.6114, 2013, pp. 1-9.
Z. Guo, Z. Zhang, R. Feng, and Z. Chen, "Soft then hard:Rethinking the quantization in neural image compression," in Proceedings of the 38th International Conference on Machine Learning, PMLR 139:3920-3929, 2021.
J. Balle, P. A. Chou, D. Minnen, S. Singh, N. Johnston,E. Agustsson, S.J. Hwang, and G. Toderici, "Nonlinear transformcoding," IEEE Journal of Selected Topics in Signal Processing,vol. 15, No. 2, 2021 (retrieved from arXiv:2007.03034v2, pp. 1-17).
Y. Bengio, N. L'eonard, and A. Courville, "Estimating or propagating gradients through stochastic neurons for conditionalcomputation," arvix preprint arXiv:1308.3432, 2013, pp. 1-12.
G.J. Sullivan, "Efficient scalar quantization of exponential andlaplacian random variables," IEEE Transactions on Information Theory, vol. 42, Issue 5, Sep. 1996, pp. 1365-1374.
G. Nigel and N. Martin, "Range encoding: An algorithm for removing redundancy from a digitised message," in Proc. Videoand Data Recording Conference, 1979, pp. 1-9.
I. Demirsahin, O. Kjartansson, A. Gutkin, and C. Rivera,"Open-source Multi-speaker Corpora of the English Accentsin the British Isles," in Proceedings of the 12th Conference on Language Resources and Evaluation (LREC 2020), pp. 6532-6541.
O. Kjartansson, A. Gutkin, A. Butryna, I. Demirsahin, andC. Rivera, "Open-Source High Quality Speech Datasets forBasque, Catalan and Galician," in Proceedings of the 1st Joint SLTU and CCURL Workshop (SLTU-CCURL 2020), pp. 21-27.
K. Sodimana, K. Pipatsrisawat, L. Ha, M. Jansche, O. Kjartansson,P. De Silva, and S. Sarin, "A Step-by-Step Process forBuilding TTS Voices Using Open Source Data and Frameworkfor Bangla, Javanese, Khmer, Nepali, Sinhala, and Sundanese," in Proc. The 6th Intl. Workshop on Spoken Language Technologies for Under-Resourced Languages (2018), pp. 66-70.
A. Guevara-Rukoz, I. Demirsahin, F. He, S.-H. C. Chu,S. Sarin, K. Pipatsrisawat, A. Gutkin, A. Butryna, and O. Kjartansson, "Crowdsourcing Latin American Spanish for Low-Resource Text-to-Speech," in Proc. 12th Language Resources and Evaluation Conference (LREC 2020), European Language Resources Association (ELRA), May 11-16, Marseille, France, pp. 6504-6513.
F. He, S.-H. C. Chu, O. Kjartansson, C. Rivera, A. Katanova,A. Gutkin, I. Demirsahin, C. Johny, M. Jansche, S. Sarin, andK. Pipatsrisawat, "Open-source Multi-speaker Speech Corporafor Building Gujarati, Kannada, Malayalam, Marathi, Tamiland Telugu Speech Synthesis Systems," in Proc. 12th Language Resources and Evaluation Conference (LREC 2020), European Language Resources Association (ELRA), May 11-16, Marseille, France, 6494-6503.
Y. M. Oo, T. Wattanavekin, C. Li, P. De Silva, S. Sarin,K. Pipatsrisawat, M. Jansche, O. Kjartansson, and A. Gutkin,"Burmese Speech Corpus, Finite-State Text Normalizationand Pronunciation Grammars with an Application to Text-to-Speech," inProc. 12th Language Resources and Evaluation Conference (LREC 2020), European Language Resources Association (ELRA), May 11-16, Marseille, France, pp. 6328-6339.
D. van Niekerk, C. van Heerden, M. Davel, N. Kleynhans,O. Kjartansson, M. Jansche, and L. Ha, "Rapid developmentof TTS corpora for four South African languages," in Proc. Interspeech 2017, pp. 2178-2182.
A. Gutkin, I. Demirs,ahin, O. Kjartansson, C. Rivera, andK. Tubosun, "Developing an Open-Source Corpus of YorubaSpeech," in Proc. of Interspeech 2020, International Speech Communication Association (ISCA), Oct. 25-29, Shanghai, China, 2020., pp. 404-408.
E. Bakhturina, V. Lavrukhin, B. Ginsburg, and Y. Zhang,"Hi-Fi Multi-Speaker English TTS Dataset," arXiv preprintarXiv:2104. 01497, 2021, pp. 1-5.
J.-M. Valin, U. Isik, P. Smaragdis, and A. Krishnaswamy,"Neural speech synthesis on a shoestring: Improving the efficiency of lpcnet," in Proc. International Conference on Acoustics, Speech and Signal Processing (ICASSP), 2022, pp. 1-5.
Babak Naderi and Ross Cutler, "An open source implementationof ITU-T recommendation P.808 with validation," in Proc.Interspeech, 2020, (retrieved from arXiv:2005.08138v1, pp. 1-5).
ITU-T Telecommunication Standardization Sectior of ITU, Recommendation P.808 (2018), "Subjective evaluation of speech quality with a crowdsourcing approach". International Telecommunication Union, Geneva, pp. 1-28.
ITU-T, Telecommunication Standardization Sectior of ITU, Recommendation P.800: "Methods for subjective determination of transmission quality", 1996, International Telecommunication Union, Geneva, pp. 1-37.
Vincenzo Liguori, "Pyramid Vector Quantization for Deep Learning" retrieved from https://arxiv.org/abs/1704.02681, 2017, pp. 1-9.

* cited by examiner

NEURAL CODING FOR REDUNDANT AUDIO INFORMATION TRANSMISSION

BACKGROUND

Over the past few years, audio processing methods (e.g., voice synthesis to generate and/or process human speech) based on deep learning have greatly surpassed traditional methods (e.g., due to various techniques such as spectral subtraction and spectral estimation). Audio processing methods may be used in a variety of applications.

For example, a teleconferencing system may be used in a noisy and reverberant environment, so audio processing/voice synthesis techniques may be needed to ensure clear communication (e.g., to fill in missing portions of speech).

Figure 1:
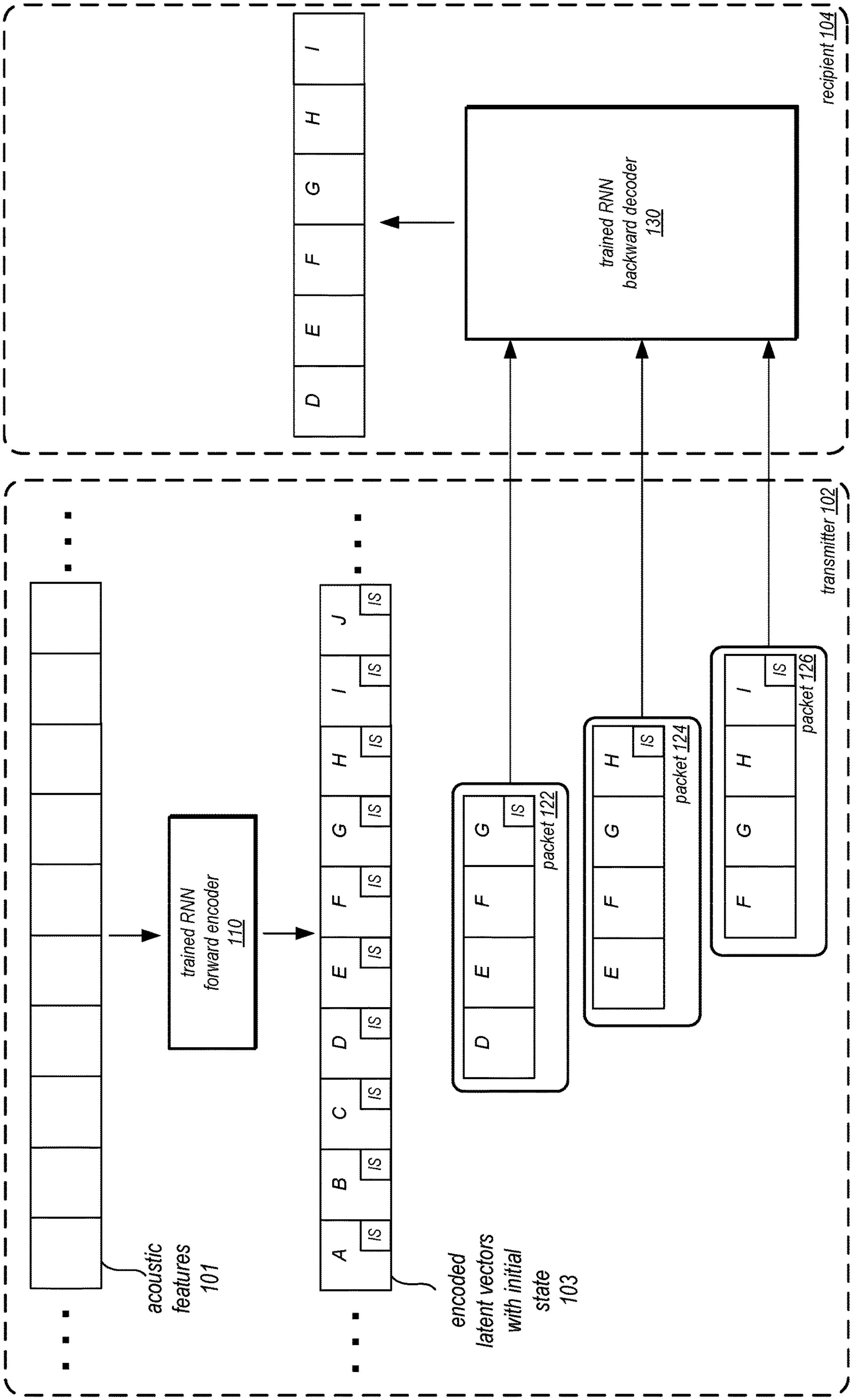
FIG. 1 illustrates a logical block diagram of forward and backward neural coding for transmitting redundant audio data, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for neural coding for redundant audio information transmission are described herein. Deep neural network machine learning techniques have significantly improved the performance of various speech processing tasks. For example, neural coding has significantly increased the quality of very low bitrate speech transmission. Such improvements can also be extended to Packet Loss Concealment (PLC). PLC techniques provide mechanisms for handling missing audio data from an audio transmission over a network, such as the Internet.

For instance, audio data may be coded and transmitted in packets over the network to a recipient. When the packets are received, the coded audio data in the packets may be decoded and used for playback or various other audio data processing tasks. Because various network conditions or other factors can affect the success rate for transmitting packets over a network, some packets containing audio data may not reach the recipient, and may be considered lost. PLC techniques provide a way to continue processing of the audio data at the recipient in spite of the loss of some packets, paving the way for more reliable audio transmission over a network. At the same time, the effectiveness of PLC techniques may become limited in their ability to conceal losses since they cannot predict missing audio data (e.g., missing phonemes/words in speech).

One technique to increase loss robustness over packet networks is to transmit redundant audio data. While transmitting redundant audio data helps to address the technical challenge of audio data that is not received because of lost packets, transmission of redundant audio data is not without cost. Transmission of redundant audio data uses some of the payload capacity of packets. Therefore, techniques that can efficiently code redundant audio data with high quality in the event that the redundant audio data is needed can increase both the quality and reliability of audio data transmission over networks.

In various embodiments, a neural coding technique for redundant audio information transmission is implemented that provides both efficient coding of the redundant audio information and quality coding of the redundant audio information. In various embodiments, efficiency may be achieved using a continuously-operating encoder with a decoder running backward in time. For example, a rate-distortion-optimized variational autoencoder (RDO-VAE) training technique may be implemented that quantizes a Laplace-distributed latent space. Such exemplary techniques could encode up to 1 second of redundancy in individual 20-millisecond (ms) packets, providing 50 times the redundancy, by adding a total of only 31 kilobytes/second. These and other embodiments of neural speech coding techniques for redundant information, can significantly improve loss robustness.

Some speech encoding schemes (sometimes referred to as codecs) for network transmission of audio data encode audio in 20-ms frames, with each frame being sent in a separate packet over the network. When any packet is lost, the corresponding audio is lost and has to be filled by a PLC technique. For example, the Opus codec defines a lowbitrate redundancy (LBRR) option that makes it possible to include for packet number n to include the contents of both frames n and n−1, with the latter being encoded at a slightly lower bitrate. This allows packets to each contain 40-ms of audio even though packets being sent at a 20-ms interval. When LBRR is enabled, a single packet loss does not cause any audio frame to be completely lost, which can improve the quality in difficult network conditions. Unfortunately, losses are rarely uniformly distributed, and LBRR has limited impact on long loss bursts. While it would be possible to code multiple additional frames as part of each packet, it would cause the bitrate to go up significantly. Accordingly, a neural coding technique is described that when implemented in various embodiments makes it possible to include a large amount of redundancy without a large increase in bitrate, improving the performance network-based transmission of audio data.

To improve robustness to packet loss, one challenge is to avoid any prediction across different packets. Within each packet, however, prediction may be allowed since a packet may be assumed to arrive uncorrupted, or not arrive at all. Additionally, since the same frame information can be encoded in multiple packets, there may be no need to re-encode each packet from scratch, but rather have a continuously running encoder from which overlapping encoded frames may be extracted. On the decoder side, since short losses are more likely than very long ones, it is desirable to be able to decode only the last few frames of speech without having to decode the entire packet.

Variable length entropy coding may be implemented as part of neural coding techniques, in various embodiments, to maximize efficiency. Even if a constant bitrate was ultimately desired, that could easily be achieved by varying the duration of the redundancy. Variable encoding quality may be advantageously implemented as a function of a timestamp within the redundant packet. For instance, more recent packets are expected to be used more often, so they could be coded at a higher quality.

In various embodiments, an auto-regressive vocoder may be implemented for neural coding techniques for redundant audio transmission. Auto-regressive vocoders may allow for seamless transitions between regular coded audio and low-bitrate redundant audio without the use of cross-fading. One example of an auto-regressive vocoder that may be implemented is LPCNet. In other embodiments, other auto-regressive vocoders may be implemented, such as WaveNet.

In various embodiments, neural coding techniques for redundant audio transmission may implement techniques for eliminating redundancy, prediction and transforms. In the context of neural coding, grouping input feature vectors is one technique that may allow an encoder to infer a non-linear transform of its input. For example, a recurrent neural network (RNN) architecture may be used for prediction. To achieve the above performance improvements, the encoder RNN may be implemented to run forward in a continuous manner, while the decoder RNN may be implemented to run backward in time, from the most recent packet encoded. To ensure that the decoder achieves sufficient quality on the first (and most recent) packet, the encoder may also code an initial state (IS) with the packet. In various embodiments, although the encoder may produce an IS on every frame, only one initial state for the most recent audio frame in a network packet is included in each network packet.

For example, FIG. 1 illustrates a logical block diagram of forward and backward neural coding for transmitting redundant audio data, according to some embodiments. Given input acoustic features of audio data 101 (which may be a spectrogram, e.g., in a Mel scale generated by a short-time Fourier transform), a trained RNN forward encoder 110 may generate a set of encoded latent vectors 103 corresponding to different audio frames (e.g., to different portions of time in the audio data) each of which may include a corresponding initial state (IS). When transmitting the encoded audio data, respective latent vectors for overlapping groups of audio frames may be included in different packets along with the IS for a most recent frame included in each packet. For example, as illustrated in FIG. 1, packet 122 has 3 overlapping audio frames with packet 124 ("E", "F", and "G"), which has three overlapping audio frames with packet 126 ("F", "G", and "H"). However, the IS included in each packet corresponds to the most recent frame (e.g., IS for "G" in packet 122, IS for "H" in packet 124, and IS for "I" in packet 126). Therefore, the IS for packet 122 is for a different frame than the IS for packets 124 and 126.

Packets 122, 124, and 126 may be transmitted from transmitter 102 to recipient 104 over a network. Recipient 104 may use a trained RNN decoder 130 that performs backward decoding, as discussed in detail below to create decoded versions of one or more of the audio frames, starting from the most recent audio frame using the IS of the packet and the latent vectors. Because redundant audio data is included in each packet, the loss of one (or multiple) packets, can be ameliorated. For instance, if packet 124 were to be lost before reaching recipient 104, the contents of packet 126 could be used to generate decoded versions of both frame "I" and "H" using the IS for "I" and latent vectors for "I" and "H").

In one example embodiment, the encoding network, the RNN, operates on 20-ms frames and the underlying 20-dimensional network feature vectors may be computed on a 10-ms interval. Accordingly, feature vectors may be grouped in pairs equivalent to a 20-ms non-linear transform. To further increase the effective transform size while still producing a redundancy packet every 20 ms, an output stride may be used. As a result, each output vector may represent 40 ms of speech. This is one example. In other embodiments, larger strides can be implemented.

In at least some embodiments, the trained RNN forward encoder 110 and the trained RNN backward decoder 130 can be created using RDO-VAE as a training technique. In such embodiments, the encoder 110 and decoder 130 may be trained to directly minimize a rate-distortion loss function. For example, from a sequence of input vectors $x \in \mathbb{R}^L$, the RDO-VAE produces an output $\tilde{x} \in \mathbb{R}^L$ by going through a sequence of quantized latent vector $z_g \in \mathbb{Z}^M$, minimizing the loss function $$\mathcal{L} = D(\tilde{x}, x) + \lambda H(z_q) \quad (1)$$

where $D(\cdot,\cdot)$ is the distortion loss, $H(\cdot)$ denotes the entropy, the Lagrange multiplier λ effectively controls the target rate.

Because the latent vectors $z_q$ are quantized, neither $D(\cdot,\cdot)$ nor $H(\cdot)$ in (1) are differentiable. For the distortion D, one technique that may be implemented is to use a straight-through estimator. Another technique for distortion may use variants of "soft" quantization—through the addition of uniformly distributed noise. In some embodiments, multiple distortion techniques may be used, such as a weighted average of the soft and straight-through distortions.

In various embodiments, the Laplace distribution may be used to model the latent space. The Laplace distribution may be easy to manipulate and is relatively robust to probability modeling mismatches. The rate of each variable may be considered independently. Accordingly, let $z_e$ and $z_q$ represent one component of the unquantized ($z_e$) and quantized ($z_q$) vectors, respectively. The continuous Laplace distribution may then be given by:

$$p(z_e) = -\frac{\log r}{2} r^{|z_e|} \tag{2}$$

where r is related to the standard deviation σ by $r=e^{-\sqrt{2}/\sigma}$.

In various embodiments, one way of quantizing a Laplace-distributed variable is to use a fixed quantization step size, except around zero, where all values of $q_e \in ]-\theta, \theta[$ quantize to zero, with $$\theta \in \left[\frac{1}{2}, 1\right]$$

arising from rate-distortion optimization. A quantizer with a step size of one may be implemented without loss of generality, in some embodiments, as the input and output can be scaled to achieve the desired quantization resolution. The quantizer may be described as:

$$z_q = Q_\theta(z_e) = \text{sgn}(z_e) \lfloor |z_e| + 1 - \theta \rfloor \tag{3}$$

where sgn(·) denotes the sign function. In the $$Q_{\frac{1}{2}}(q_e) = \lceil q_e \rfloor$$

special case, rounding to the nearest integer (ignoring ties) may be implemented.

The discrete probability distribution function of a quantized Laplace distribution is $$P(z_q) = \begin{cases} 1 - r^\theta & z_q = 0 \\ \frac{1}{2}(1-r) r^{|z_q| + \theta - 1} & z_q = 0 \end{cases} \tag{4}$$

Since its entropy, $H(z_q) = \mathbb{E}[-\log_2 P(z_q)]$ is not differentiable with respect to $z_e$, backpropagation of the gradient may be implemented.

A differentiable rate estimation may be used on the unquantized encoder output. In some embodiments, the differential entropy $h(z_e) = \mathbb{E}[-\log_2 p(z_e)]$, may be used. In another embodiment, the continuous $z_e$ may be used with the entropy of the discrete distribution $H(z_e) = \mathbb{E}[-\log_2 P(z_e)]$. The threshold value θ may be selected in such a way that $z_e=0$ is no longer a special case, resulting in $$H(z_e) = -\log_2 \frac{1-r}{1+r} - \mathbb{E}[|z_e|] \log_2 r. \tag{5}$$

In the degenerate case where r=0 (and thus $z_e=0$), it may be that $H(z_e)=0$. An advantage of using equation (5) is that any latent dimension that does not sufficiently reduce the distortion to be "worth" its rate naturally may become degenerate during training. This allows for starting with more latent dimensions than needed and letting the model decide on the number of useful dimensions. For instance, different values of λ may result in a different number of non-degenerate probability distribution functions.

The dead zone, as described by the quantizer $Q_\theta(z)$ in equation (3) may be differentiable with respect to both its input parameter z and its width θ. That can be achieved by implementing it as the differentiable function $$\zeta(z) = z - \delta \tanh \frac{z}{\delta + \epsilon} \tag{6}$$

where δ≈θ controls the width of the dead zone and ∈=0.1 avoids training instabilities. The complete quantization process becomes $$z_q = \lfloor q_\lambda \cdot \zeta(z_e) \rceil \tag{7}$$

where ⌊·⌉ denotes rounding to the nearest integer, and $q_\lambda$ is the quantizer scale (e.g., higher $q_\lambda$ leads to higher quality). The quantizer scale $q_\lambda$ may be learned independently as an embedding matrix for each dimension of the latent space and for each value of the rate-control parameter λ.

The quantized latent components $z_q$ can be entropy-coded using the discrete probability distribution function in (4) parametrized by r and θ. The value of θ may be learned independently from the quantizer dead-zone parameter δ. Also, a different r parameter can be learned for the soft and hard quantizers (the value of θ for the soft quantizer is implicit and thus may not need to be learned).

On the decoder side, the quantized latent vector is entropy-decoded and the scaling is undone:

$$z_d = q_\lambda^{-1} \cdot z_q. \tag{8}$$

In various embodiments, the IS vector s may be quantized to be used by the decoder. Although the encoder produces an IS at every frame, only one IS redundancy packet may need to be transmitted, as discussed above with regard to FIG. 1. For that reason, multiplying the rate of IS redundancy packet by λ may not be implemented in some embodiments. Instead, to simplify the IS encoding, an algebraic variant of vector-quantized VAE (VQ-VAE) based on the pyramid vector quantizer (PVQ) may be implemented, with a spherical codebook described as $$S_{N,K} = \left\{ \frac{p}{\|p\|} : p \in \left\{ \mathbb{Z}^N : \sum_{i=0}^{N-1} |p_i| = K \right\} \right\}, \tag{9}$$

where N is the dimensionality of the IS and K determines the size (and the rate) of the codebook. The size of the codebook $S_{N,K}$ is given by the recurrent expression $V_{N,K} = V_{N-1,K} + V_{N,K-1} + V_{N-1,K-1}$, with $V_{0,K}=0$ for K>0 and $V_{N,0}=1$. In some embodiments, a straight-through gradient estimator for PVQ-VAE training may be implemented.

In various embodiments, during training, λ may be varied in such a way as to obtain average rates (e.g., between 15 and 85 bits) per vector. The λ range can be split into equally-spaced intervals in the log-domain (e.g., 16 intervals). For each interval, independent values can be learned for q, δ, θ, as well as for the hard and soft versions of the Laplace parameter r. To avoid giving too much weight to the low-bitrate cases because of the large λ values, the difference in losses can be reduced by weighting the loss values by $1\sqrt{\lambda}$.

A large overlap between decoded sequences can pose a challenge for training neural networks for coding for redundant audio transmission. Running a large number of overlapping decoders would be computationally challenging. On the other hand, decoding the entire sequence produced by the encoder with a single decoder leads to the model over-fitting to that particular case. In some embodiments, training may include splitting the encoded sequence into a number of non-overlapping sequences (e.g., four sequences) to be independently decoded. In this way, the training technique can lead to both acceptable trained performance and training time.

Figure 2:
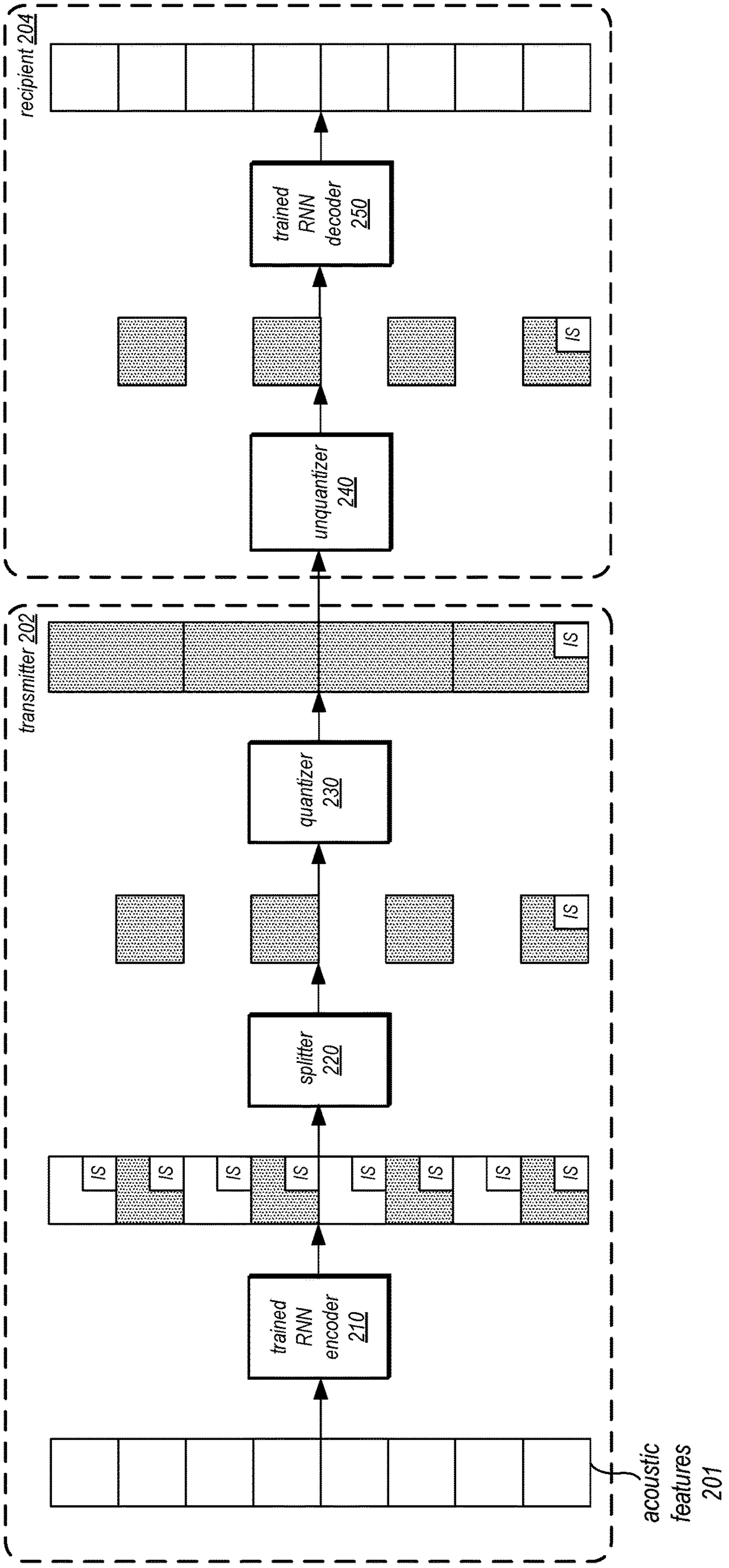
FIG. 2 illustrates a logical block diagram of forward and backward neural coding with splitting and quantization for transmitting redundant audio data, according to some embodiments.

As discussed above, in some embodiments, splitting and quantization techniques may be implemented to further optimize the performance of the encoding between frames. FIG. 2 illustrates a logical block diagram of forward and backward neural coding with splitting and quantization for transmitting redundant audio data, according to some embodiments. Acoustic frames 201 may be received or otherwise obtained by transmitter 202. A trained RNN encoder 210 (e.g., $z_e(x)$) may be implemented to generate IS for each frame that is usable to decode frames backward through a split set of frames, as depicted by the output of splitter 220. Quantizer 230 (e.g., $\lfloor\zeta(q\cdot z_e)\rceil$) can then scale a split set of frames for inclusion in a network packet to be transmitted to recipient 204.

Recipient 204 may then implement unquantizer 240 (e.g., $q^{-1}$, $z_q$), which may take the quantized frames and initial state and undo the scaling. The subset of frames may then be decoded using trained RNN decoder 250 (d(z)) to produce the subset of audio frames 201 at recipient.

This specification includes a general description of a provider network that implements multiple different services (FIG. 3), including an audio-transmission service, which facilitates audio transmission for clients that implement forward and backward neural coding for transmitting redundant audio data. Then various examples of, including different components/modules, or arrangements of components/modules that may be employed as part of implementing the services are discussed in FIG. 4A number of different methods and techniques to implement efficient audio processing using forward and backward neural coding for transmitting redundant audio data are then discussed, some of which are illustrated in accompanying flowcharts. Finally, a description of an example computing system upon which the various components, modules, systems, devices, and/or nodes may be implemented is provided. Various examples are provided throughout the specification.

Figure 3:
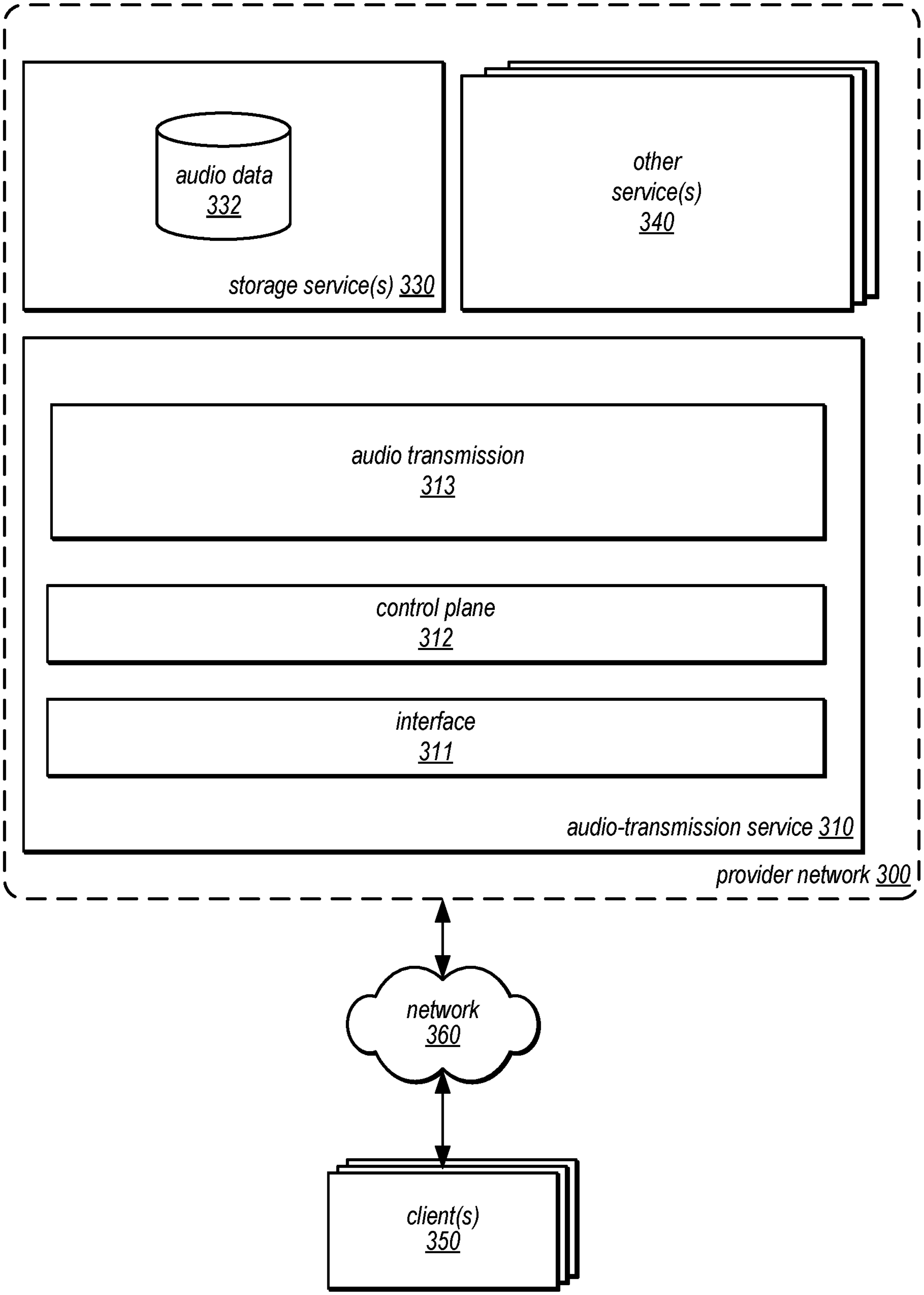
FIG. 3 illustrates an example provider network that may implement an audio-transmission service that supports communications between devices that use neural coding for redundant audio data, according to some embodiments.

FIG. 3 illustrates an example provider network that may implement an audio-transmission service that supports communications between devices that use neural coding for redundant audio data, according to some embodiments. Provider network 300 may be a private or closed system or may be set up by an entity such as a company or a public sector organization to provide one or more services (such as various types of cloud-based storage) accessible via the Internet and/or other networks to clients 350, in one embodiment. Provider network 300 may be implemented in a single location or may include numerous data centers hosting various resource pools, such as collections of physical and/or virtualized computer servers, storage devices, networking equipment and the like (e.g., computing system 700 described below with regard to FIG. 7), needed to implement and distribute the infrastructure and services offered by the provider network 300, in one embodiment. In some embodiments, provider network 300 implements various computing resources or services, such as audio-transmission service 310, storage service(s) 330, and/or any other type of network-based services 340 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a system that includes a number of computing nodes (or simply, nodes), each of which may be similar to the computer system embodiment illustrated in FIG. 7 and described below, in one embodiment. In various embodiments, the functionality of a given system or service component (e.g., a component of audio-transmission service 310 may be implemented by a particular node or may be distributed across several nodes. In some embodiments, a given node may implement the functionality of more than one service system component (e.g., more than one data store component).

Audio-transmission service 310 implements interface 311 to allow clients (e.g., client(s) 350 or clients implemented internally within provider network 300, such as a client application hosted on another provider network service like an event driven code execution service or virtual compute service) to send audio data (e.g., speech input waveform or acoustic feature representation of a speech waveform) for processing, enhancement, storage, and/or transmission. In at least some embodiments, audio-transmission service 310 also supports the transmission of video data along with the corresponding audio data and thus may be an audio/video transmission service, which may support transmission for audio data captured along with video data using neural coding techniques discussed above. For example, audio-transmission service 310 may implements interface 311 (e.g., a graphical user interface, programmatic interface that implements Application Program Interfaces (APIs) and/or a command line interface) so that a client application can submit an audio stream captured by sensor(s) 352 to be stored as audio data 332 stored in storage service(s) 330, or other storage locations or resources within provider network 300 or external to provider network 300 (e.g., on premise data storage in private networks). Interface 311 allows a client to send audio data as part of audio transmission, such as voice transmission like Voice over IP (VOIP) or as part of an audio/video transmission in accordance with WebRTC or another suitable audio/video transmission protocols.

Audio-transmission service 310 implements a control plane 312 to perform various control operations to implement the features of audio-transmission service 310. For example, control plane 312 may monitor the health and performance of requests at different components audio-transmission 313 (e.g., the health or performance of various nodes implementing these features of audio-transmission service 310). If a node fails, a request fails, or other interruption occurs, control plane 312 may be able to restart a job to complete a request (e.g., instead of sending a failure response to the client). Control plane 312 may, in some embodiments, may arbitrate, balance, select, or dispatch requests to different node(s). For example, control plane 312 may receive requests interface 311 which may be a programmatic interface, and identify an available node to begin work on the request.

Figure 4:
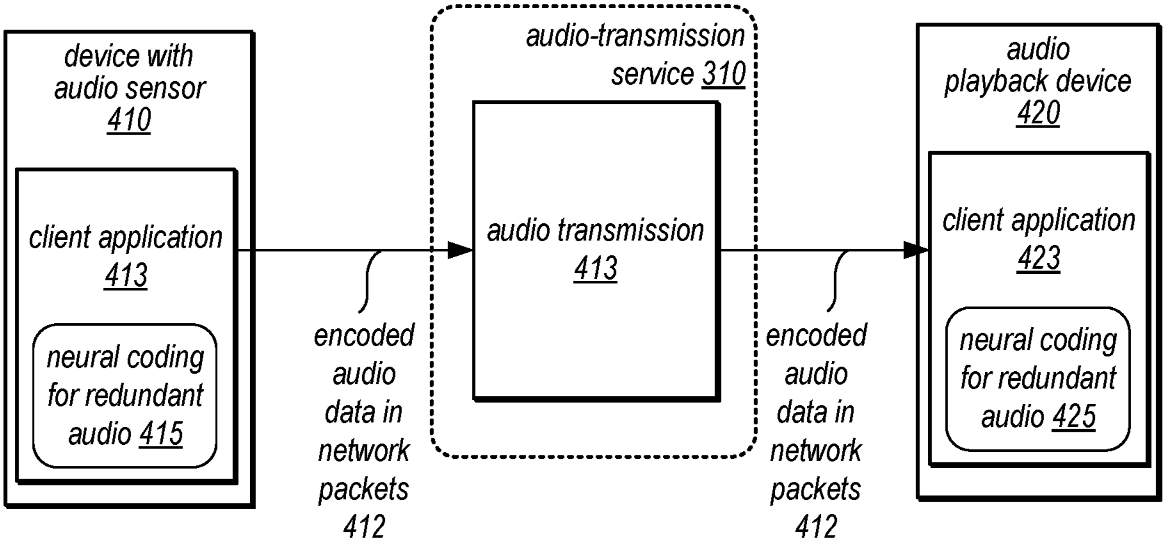
FIG. 4 illustrates a logical block diagram of interactions between client applications that utilize neural coding for redundant audio, according to some embodiments.

Audio-transmission service 310 implements audio-transmission 313, which may facilitate audio communications (e.g., for audio-only, video, or other speech communications), speech commands or speech recordings, or various other audio transmissions, as discussed below with regard to FIG. 4.

Data storage service(s) 330 may implement different types of data stores for storing, accessing, and managing data on behalf of clients 350 as a network-based service that enables clients 350 to operate a data storage system in a cloud or network computing environment. Data storage service(s) 330 includes various kinds relational or non-relational databases, in some embodiments. Data storage service(s) 330 includes object or file data stores for putting, updating, and getting data objects or files, in some embodiments. Data storage service(s) 330 may be accessed via programmatic interfaces (e.g., APIs) or graphical user interfaces. Processed audio 332 is put and/or retrieved from data storage service(s) 330 via an interface for data storage services 330, in some embodiments.

Generally speaking, clients 350 may encompass any type of client that can submit network-based requests to provider network 300 via network 360, including requests for audio-transmission service 310 (e.g., a request to enhance, transmit, and/or store audio data). For example, a given client 350 may include a suitable version of a web browser, or may include a plug-in module or other type of code module that can execute as an extension to or within an execution environment provided by a web browser. Alternatively, a client 350 may encompass an application (or user interface thereof), a media application, an office application or any other application that may make use of audio-transmission service 310 (or other provider network 300 services) to implement various applications. In some embodiments, such an application includes sufficient protocol support (e.g., for a suitable version of Hypertext Transfer Protocol (HTTP)) for generating and processing network-based services requests without necessarily implementing full browser support for all types of network-based data. That is, client 350 may be an application that can interact directly with provider network 300. In some embodiments, client 350 generates network-based services requests according to a Representational State Transfer (REST)-style network-based services architecture, a document or message-based network-based services architecture, or another suitable network-based services architecture.

In some embodiments, a client 350 provides access to provider network 300 to other applications in a manner that is transparent to those applications. Clients 350 convey network-based services requests (e.g., requests to interact with services like audio-transmission service 310) via network 360, in one embodiment. In various embodiments, network 360 encompasses any suitable combination of networking hardware and protocols necessary to establish network-based-based communications between clients 350 and provider network 300. For example, network 360 may generally encompass the various telecommunications networks and service providers that collectively implement the Internet. Network 360 also includes private networks such as local area networks (LANs) or wide area networks (WANs) as well as public or private wireless networks, in one embodiment. For example, both a given client 350 and provider network 300 are respectively provisioned within enterprises having their own internal networks. In such an embodiment, network 360 may include the hardware (e.g., modems, routers, switches, load balancers, proxy servers, etc.) and software (e.g., protocol stacks, accounting software, firewall/security software, etc.) necessary to establish a networking link between given client 350 and the Internet as well as between the Internet and provider network 300. It is noted that in some embodiments, clients 350 communicate with provider network 300 using a private network rather than the public Internet.

Audio sensor, such as microphones, may, in various embodiments, collect, capture, and/or report various kinds of audio data, (or audio data as part of other captured data like video data). Audio sensors may be implemented as part of devices, such as various mobile or other communication and/or playback devices, such as microphones embedded in "smart-speaker" or other voice command-enabled devices. In some embodiments, some or all of audio processing techniques are implemented as part of devices that include sensors before transmission of audio to audio-transmission service 310, as discussed below with regard to FIG. 4.

As discussed above, different interactions between sensors that capture audio data and services of a provider network 300 invoke audio transmission, in some embodiments. FIG. 4 illustrates a logical block diagram of interactions between client applications that utilize neural coding for redundant audio, according to some embodiments. In FIG. 4, device with audio sensor 410 may capture audio data from various environments, including speech audio. Device with audio sensor 410 may implement client application 413. Client application 413 may be client application provided by audio transmission service 310 (e.g., as part of providing device 410 or separately downloaded and installed on device 410 via an interface for audio-transmission service 310 (e.g., interface 311)). Client application 412 may utilize neural coding for redundant audio 415 as part of a codec or other encoding scheme for transmitting audio data (including redundant audio data), such as by sending captured audio data as network packets with encoded audio data 412 over a wired or wireless network connection to audio-transmission service 310. In some embodiments, device with audio sensor 410 provides the captured audio data to another device that implements client application 413 to encode and send the network packets to audio-transmission service (not illustrated). In some embodiments, client application 413 may support live communications, such as a VoIP call, and thus encoded audio data in network packets 412 may be sent as part of a stream of audio data.

Audio-transmission service 310 may identify a destination for the audio, such as audio playback device 420, and send the network packets with encoded audio data 412 to audio playback device 420, in some embodiments. Audio playback device 420 may implement client application 423. Client application 423 may be a client application provided by audio transmission service 310 (e.g., as part of providing device 410 or separately downloaded and installed on device 420 via an interface for audio-transmission service 310 (e.g., interface 311)). Client application 423 may utilize neural coding for redundant audio 425 as part of decoded audio data received in network packets 412. Because of the redundant audio data, client application 423 may implement PLC and other audio improvement techniques using the redundant audio data. Although a single communication path is depicted in FIG. 4, client applications 413 and 423 may support multi-way communications between two or more client applications, acting as a transmitter for audio data captured at the device and a receiver with playback for audio data received at the device. Accordingly, each client application 413 and 423 may both encode and decode according to the techniques discussed above with regard to FIGS. 1 and 2 and below with regard to FIGS. 5 and 6.

Figure 5:
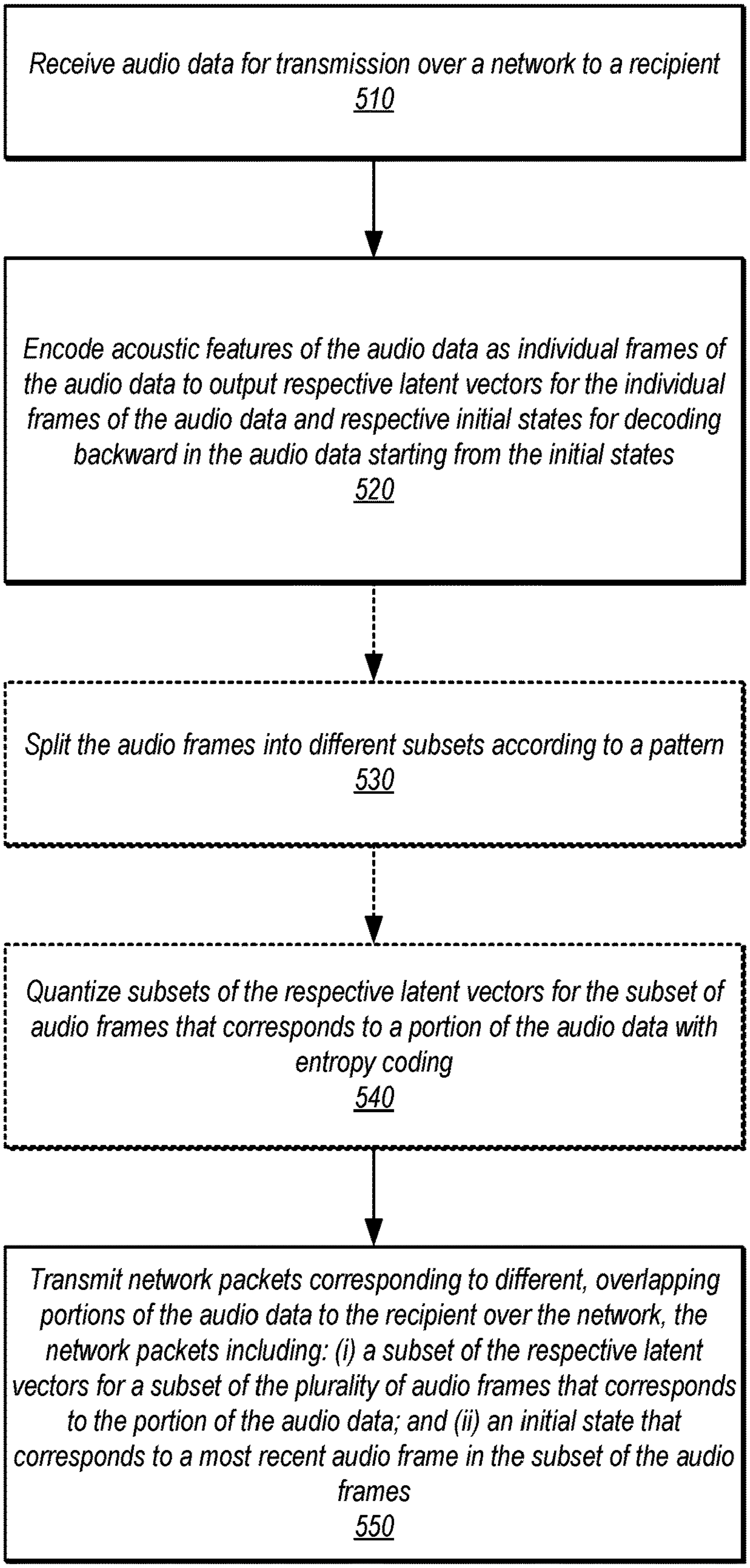
FIG. 5 illustrates a high-level flowchart of various methods and techniques to implement continuous forward encoding for audio data that includes an initial state in a network packet for transmission to a recipient, according to some embodiments.

The examples of forward and backward neural coding for transmitting redundant audio data discussed above with regard to FIGS. 2-4 have been given in regard to one example of an audio transmission service. Various other types of services, systems, or applications may implement these techniques. FIG. 5 illustrates a high-level flowchart of various methods and techniques to implement continuous forward encoding for audio data that includes an initial state in a network packet for transmission to a recipient, according to some embodiments. These techniques, as well as the techniques discussed below with regard to FIG. 6, may be implemented using various components of client applications as described above with regard to FIGS. 2-4 or other types or systems implementing or utilizing audio transmission over a network.

As indicated at 510, audio data for transmission over a network to a recipient is received, in some embodiments. The audio data may be captured using an audio sensor (e.g., a microphone) at a device executing an application that transmits the received audio data according to the following techniques. In some embodiments, the application may be a client application of an audio transmission service, as discussed above with regard to FIGS. 3 and 4. In some embodiments, the application may facilitate direct communication between applications (e.g., without the use of an audio transmission service). The audio data may be received in various file formats (e.g., according to the audio sensor that captures the audio data). In some embodiments, the audio data may be processed through portions of a codec that includes an encoder (for encoding audio data as discussed below and a decoder for decoding received audio data as discussed below, whether received as part of a same or different audio communication) or other encoding scheme for audio data that generates a vector other set of acoustic features that describe a portion (e.g., a frame) of audio data. In some embodiments, the received audio data may be a live stream of audio data for real-time audio communication systems (e.g., audio or video conferencing applications).

As indicated at 520, acoustic features of the audio data is encoded as individual frames of the audio data to output respective latent vectors for the individual frames of the audio data and respective initial states for decoding backward in the audio data starting from the initial states, in some embodiments. For example, as discussed above with regard to FIGS. 1 and 2, an autoencoder technique that processes the audio data through an RNN trained to apply continuous forward encoding between individual frames to output respective latent vectors for the individual frames of the audio data and respective initial states for decoding backward in the audio data starting from the initial states may be utilized. The RNN for encoding may take as input the acoustic feature vectors of audio data to generate respective output latent vector(s), which may be vectors representing the encoded form of a frame's features in latent space and an initial state (which may also be represented as a vector). These initial states can later be used (as discussed above with regard to FIGS. 1 and 2 above and FIG. 6 below) to decode the latent vectors for audio frames. In other embodiments, different techniques for generating latent vectors and respective initial states for audio data can be utilized that do not apply an encoder neural network trained together with a decoder neural network (e.g., an autoencoder technique).

In some embodiments, audio frame splitting and quantization techniques may be implemented. In other embodiments, audio frame splitting and quantization may not be implemented. The dotted outline of elements 530 and 540 indicate the possible inclusion of splitting and quantization in some embodiments. For example, as indicated at 530, the audio frames may be split into different subsets according to a pattern. One example of a pattern is illustrated above with regard to FIG. 2, where the audio frames are split into two alternating groups. Other, larger numbers of splits may be possible (e.g., 3-way, 4-way, and so on).

As indicated at 540, the subsets of the respective latent vectors for the subset of audio frames that corresponds to a portion of the audio data are quantized with entropy encoding, in some embodiments. For example, as discussed above, a Laplace distribution as exemplified at equation (7) above can be applied to generate quantized and entropy coded latent vectors for inclusion in network packets.

As indicated at 550, network packets corresponding to different, overlapping portions of the audio data are transmitted to the recipient over the network, in some embodiments. The network packets may include (i) a subset of the respective latent vectors for a subset of the audio frames that corresponds to the portion of the audio data; and (ii) an initial state that corresponds to a most recent audio frame in the subset of the audio frames. As discussed above with regard to FIGS. 1 and 2 and below with regard to FIG. 6, an initial state included in the packet can be used to perform backward decoding from the most recent audio frame. By using the initial state of the most recent audio frame, these techniques can ensure that high quality audio data for the more recent audio frame(s) is available for techniques that generate missing audio data, as discussed above.

Figure 6:
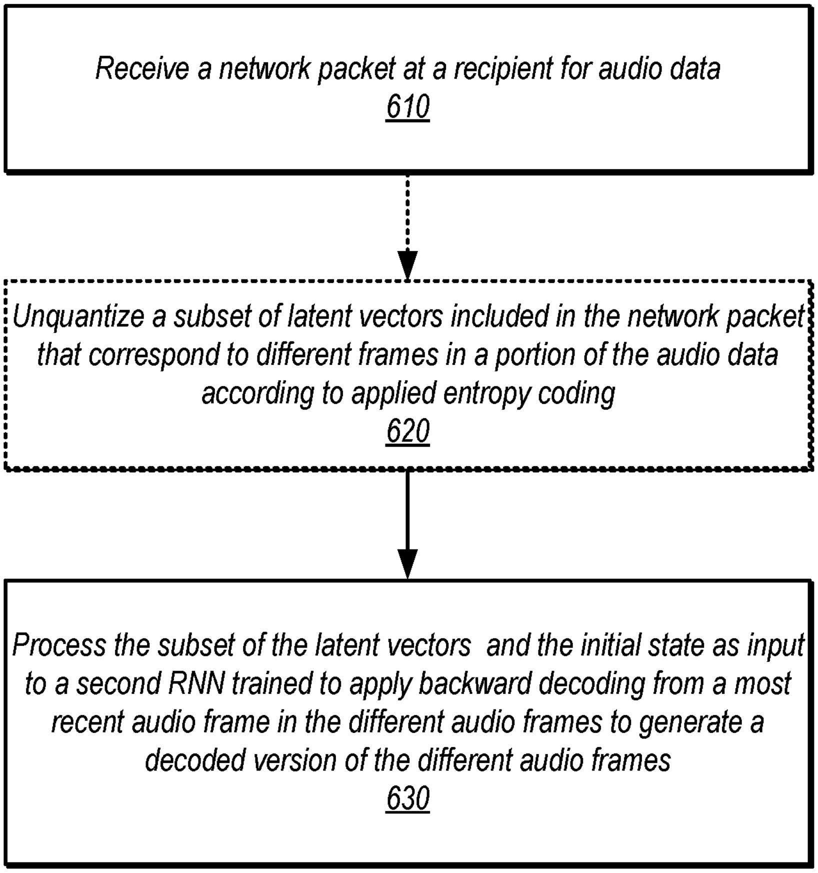
FIG. 6 illustrates a high-level flowchart of various methods and techniques to implement backward decoding for a network packet that includes an initial state and multiple encoded frames of audio data at a recipient, according to some embodiments.

FIG. 6 illustrates a high-level flowchart of various methods and techniques to implement backward decoding for a network packet that includes an initial state and multiple encoded frames of audio data at a recipient, according to some embodiments. As indicated at 610, a network packet is received at a recipient for audio data, in some embodiments. The network packet may include audio data encoded according to the techniques discussed above with regard to FIG. 5. As noted above, the recipient may be a client application of an audio transmission service, as discussed above with regard to FIGS. 3 and 4. In some embodiments, the recipient may be an application that facilitates direct communication between applications (e.g., without the use of an audio transmission service).

In some embodiments, audio frame splitting and quantization techniques may be implemented. In other embodiments, audio frame splitting and quantization may not be implemented. The dotted outline of element 620 indicates the possible inclusion of splitting and quantization, in some embodiments. For example, as indicated at 620, a subset of latent vectors included in the network packet that correspond to different frames in a portion of the audio data is unquantized, in some embodiments. For example, as discussed above, quantized latent vectors can be entropy-decoded with scaling undone according to the technique described by equation (8).

As indicated at 630, the subset of the latent vectors and the initial state is processed as input to a second RNN trained to apply backward decoding from a most recent audio frame in the different audio frames to generate a decoded version of one or more of the different audio frames, in some embodiments. The output of the second RNN may be acoustic feature vectors or other audio corresponding to the codec or other encoding scheme for the audio data. Given the audio data included in the one network packet includes multiple frames, downstream audio processing may utilize this redundant audio information in scenarios where missing audio data is identified (e.g., missing as a result of lost or dropped network packets) and generated using the additional latent vectors for additional audio frames included in the network packet. In this way, the redundant audio data to improve the quality of playback for the transmitted audio data.

The methods described herein may in various embodiments be implemented by any combination of hardware and software. For example, in one embodiment, the methods are implemented on or across one or more computer systems (e.g., a computer system as in FIG. 7) that includes one or more processors executing program instructions stored on one or more computer-readable storage media coupled to the processors. The program instructions may implement the functionality described herein (e.g., the functionality of various servers and other components that implement the audio processing system described herein). The various methods as illustrated in the figures and described herein represent example embodiments of methods. The order of any method may be changed, and various elements may be added, reordered, combined, omitted, modified, etc.

Figure 7:
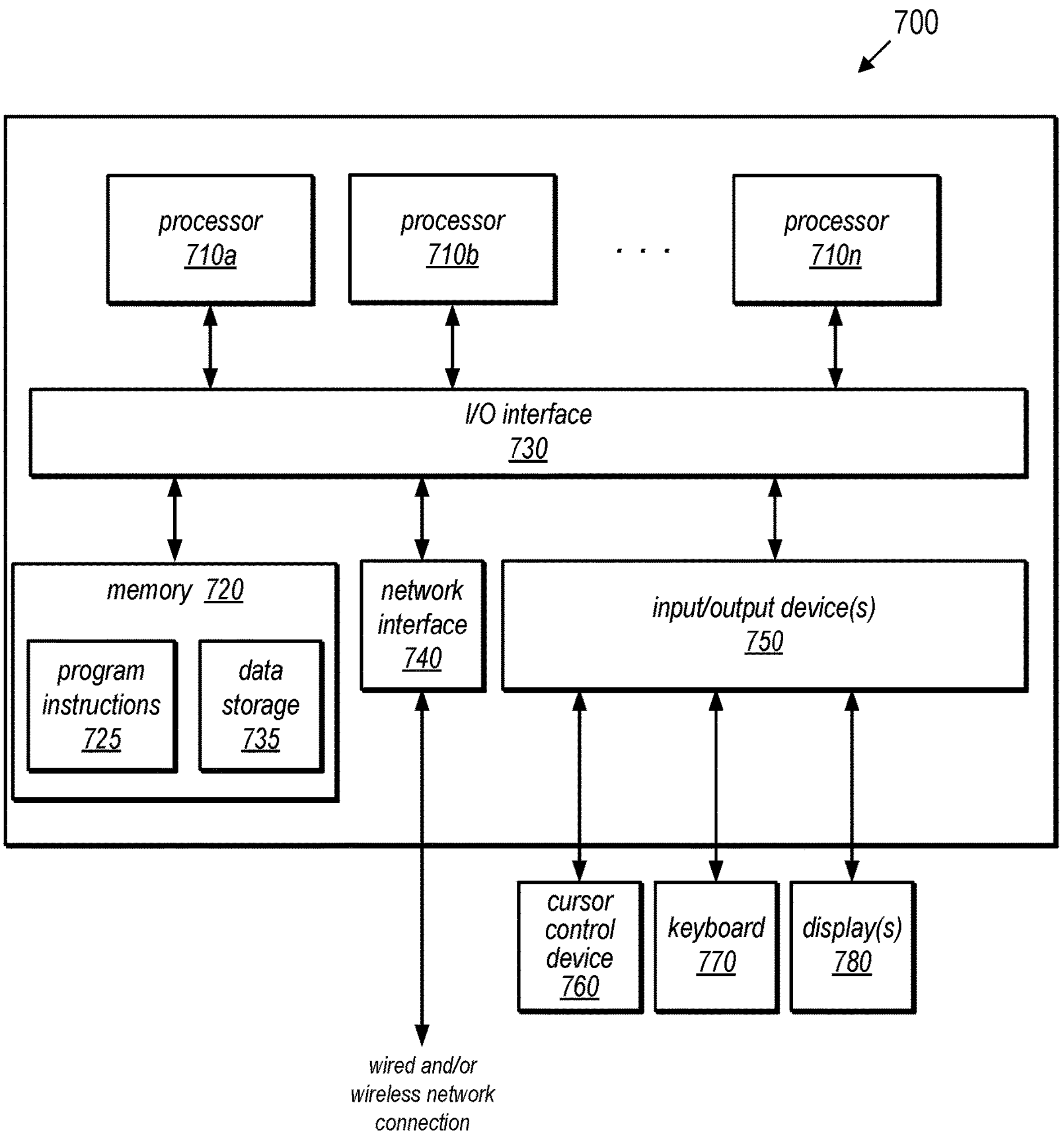
FIG. 7 illustrates an example system to implement the various methods, techniques, and systems described herein, according to some embodiments.

Embodiments of neural coding for redundant audio information transmission as described herein may be executed on one or more computer systems, which may interact with various other devices. One such computer system is illustrated by FIG. 7. In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. Display(s) 780 may include standard computer monitor(s) and/or other display systems, technologies or devices. In at least some implementations, the input/output devices 750 may also include a touch or multi-touch enabled device such as a pad or tablet via which a user enters input via a stylus-type device and/or one or more digits. In some embodiments, it is contemplated that embodiments may be implemented using a single instance of computer system 700, while in other embodiments multiple such systems, or multiple nodes making up computer system 700, may host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 720 may store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio processing as described above are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a non-transitory, computer-readable storage medium may include storage media or memory media such as magnetic or optical media, e.g., disk or CD/DVD-ROM coupled to computer system 700 via I/O interface 730. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 725, that implement the various methods and techniques as described herein, including the application of forward and backward neural coding for transmitting redundant audio data, comprising various data accessible by program instructions 725. In one embodiment, program instructions 725 may include software elements of embodiments as described herein and as illustrated in the Figures. Data storage 735 may include data that may be used in embodiments. In other embodiments, other or different software elements and data may be included.

Those skilled in the art will appreciate that computer system 700 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 700 may be transmitted to computer system 700 via transmission media or signals such as electrical, electromagnetic, or digital signals, conveyed via a communication medium such as a network and/or a wireless link.

Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
- a first device, comprising:
  - an audio sensor;
  - a first processor; and
  - a first memory, storing program instructions that when executed by the first processor, cause the first processor to:
    - receive a stream of audio data captured by the audio sensor for transmission over a network to a recipient;
    - encode acoustic features of the stream of audio data for a plurality of individual frames of the audio data according to an autoencoder technique, wherein the encoding processes the stream of audio data through a first recurrent neural network (RNN) trained to apply continuous forward encoding between the individual frames to output respective latent vectors for the individual frames of the audio data and respective initial states for decoding backward in the stream of audio data starting from the initial states;

generate a plurality of network packets corresponding to different, overlapping portions of the stream of audio data, wherein individual ones of the plurality of network packets comprise:

a subset of the respective latent vectors for a subset of the plurality of audio frames that corresponds to the portion of the stream of audio data; and one of the respective initial states that corresponds to a most recent audio frame in the subset of the audio frames; and send the plurality of network packets to the recipient over the network;

a second device, comprising:

a second processor; and a second memory, storing further program instructions that when executed by the second processor, cause the second processor to:

receive one of plurality of network packets;

decode the one network packet, wherein the decode processes the subset of the respective latent vectors for the subset of the plurality of audio frames and the initial state as input to a second RNN trained to apply backward decoding from the most recent audio frame in the subset of audio frames to generate a decoded version for at least one of the subset of the plurality of audio frames.

2. The system of claim 1, wherein to generate the plurality of network packets corresponding to different, overlapping portions of the stream of audio data, the program instructions cause the at least one processor to:

split the plurality of audio frames into different subsets according to a pattern; and quantize the subset of the respective latent vectors for the subset of the plurality of audio frames that corresponds to the portion of the stream of audio data with entropy coding.

3. The system of claim 1, wherein the autoencoder technique is a training technique that trains the first RNN to minimize a rate-distortion loss function.

4. The system of claim 1, wherein the first device is a first client of an audio transmission service offered by a provider network, wherein the plurality of network packets are sent via the audio transmission service, and wherein the second device is a second client of the audio transmission service.

5. A method, comprising:

receiving, at a transmission device, audio data for transmission over a network to a recipient device;

encoding, by the transmission device, acoustic features of the audio data as a plurality of individual frames of the audio data, wherein the encoding outputs respective latent vectors for the individual frames of the audio data and respective initial states for decoding backward in the audio data starting from the initial states;

transmitting, by the transmission device, a plurality of network packets corresponding to different, overlapping portions of the audio data to the recipient device over the network, wherein individual ones of the plurality of network packets comprise:

a subset of the respective latent vectors for a subset of the plurality of audio frames that corresponds to the portion of the audio data; and one of the respective initial states that corresponds to a most recent audio frame in the subset of the audio frames.

6. The method of claim 5, further comprising decoding, at the recipient device, a network packet comprising two or more latent vectors for two or more audio frames, wherein the decoding processes the two or more latent vectors and an included initial state in the network packet as input to a recurrent neural network trained to apply backward decoding from a most recent audio frame of the two or more audio frames to generate a decoded version of at least one of the two or more audio frames.

7. The method of claim 5, wherein transmitting the plurality of network packets corresponding to different, overlapping portions of the audio data to the recipient device over the network, comprises:

splitting the plurality of audio frames into different subsets according to a pattern; and quantizing the subset of the respective latent vectors for the subset of the plurality of audio frames that corresponds to the portion of the audio data with entropy coding.

8. The method of claim 7, further comprising decoding, at the recipient, one of the plurality of network packets, wherein the decoding unquantizes the subset of the respective latent vectors according to the entropy coding.

9. The method of claim 5, wherein the recipient device further generates a decoded version of one of the subset of audio frames to replace missing audio data.

10. The method of claim 5, wherein encoding comprises processing the acoustic features through a recurrent neural network trained to apply continuous forward encoding between the individual frames to output the respective latent vectors for the individual frames of the audio data and the respective initial states for decoding backward in the audio data starting from the initial states.

11. The method of claim 5, wherein the encoding is performed by a first recurrent neural network trained according to an autoencoder technique with a second recurrent neural network implemented at the recipient device for decoding the plurality of network packets.

12. The method of claim 5, wherein the transmission device is a first client of an audio transmission service offered by a provider network, wherein the plurality of network packets are transmitted via the audio transmission service, and wherein the recipient device is a second client of the audio transmission service.

13. One or more non-transitory, computer-readable storage media, storing program instructions that when executed on or across one or more computing devices cause the one or more computing devices to implement an encoder and a decoder as part of an audio codec:

wherein the encoder:

encodes acoustic features of audio data for a plurality of individual frames of the audio data to output respective latent vectors for the individual frames of the audio data and respective initial states for decoding backward in the audio data starting from the initial states; and generates a plurality of network packets corresponding to different, overlapping portions of the audio data to send to a recipient, wherein individual ones of the plurality of network packets comprise:

a subset of the respective latent vectors for a subset of the plurality of audio frames that corresponds to the portion of the audio data; and one of the respective initial states that corresponds to a most recent audio frame in the subset of the audio frames; and wherein the decoder:

decodes a network packet received as part of an audio transmission, wherein the network packet comprises two or more latent vectors for two or more audio frames and an initial state, wherein the decoding processes the two or more latent vectors for the two or more audio frames and the initial state to apply backward decoding from a most recent audio frame in the two or more audio frames to generate a decoded version of at least one of the two or more audio frames.

14. The one or more non-transitory, computer-readable storage media of claim 13, wherein the decoding processes the two or more latent vectors for the two or more audio frames and the initial state as input to a recursive neural network trained to apply backward decoding from the most recent audio frame in the two or more audio frames.

15. The one or more non-transitory, computer-readable storage media of claim 13, wherein, in generating the plurality of network packets corresponding to the different, overlapping portions of the audio data, the encoder:

splits the plurality of audio frames into different subsets according to a pattern; and quantizes the subset of the respective latent vectors for the subset of the plurality of audio frames that corresponds to the portion of the audio data with entropy coding.

16. The one or more non-transitory, computer-readable storage media of claim 13, wherein the decoding unquantizes the two or more respective latent vectors with entropy coding.

17. The one or more non-transitory, computer-readable storage media of claim 13, storing further program instructions that when executed on or across the one or more computing devices, further cause the decoder to replace missing audio data of the audio transmission using the decoded version of the at least one audio frame.

18. The one or more non-transitory, computer-readable storage media of claim 13, wherein the encoding processes the acoustic features through a recurrent neural network trained to apply continuous forward encoding between the individual frames to output the respective latent vectors for the individual frames of the audio data and the respective initial states for decoding backward in the audio data starting from the initial states.

19. The one or more non-transitory, computer-readable storage media of claim 13, wherein the encoding and the decoding are performed by respective recurrent neural networks trained according to an autoencoder technique.

20. The one or more non-transitory, computer-readable storage media of claim 13, wherein the one or more computing devices are program instructions implement a first client application of an audio transmission service offered by a provider network and wherein the plurality of network packets are sent via the audio transmission service to a recipient that is a second client application of the audio transmission service.

* * * * *